B. C. COONS.
FRUIT OR VEGETABLE FEEDING MACHINE.
APPLICATION FILED FEB. 14, 1910.
1,086,753.
Patented Feb. 10, 1914.
5 SHEETS—SHEET 2.
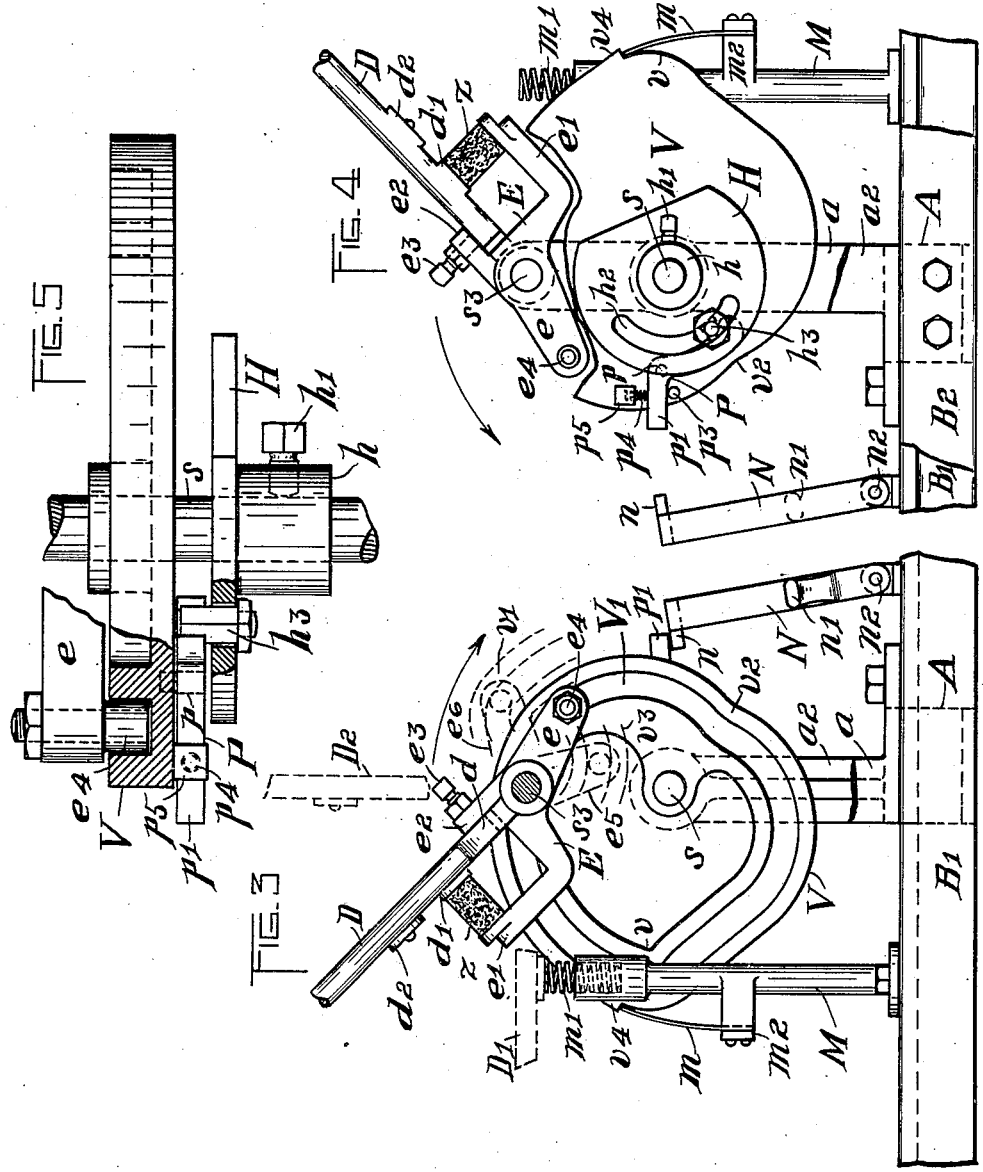
WITNESSES:
Martha M. Nelson
Osborne F. Gurney
INVENTOR:
Burton C. Coons
By W. H. Cooley ATTY

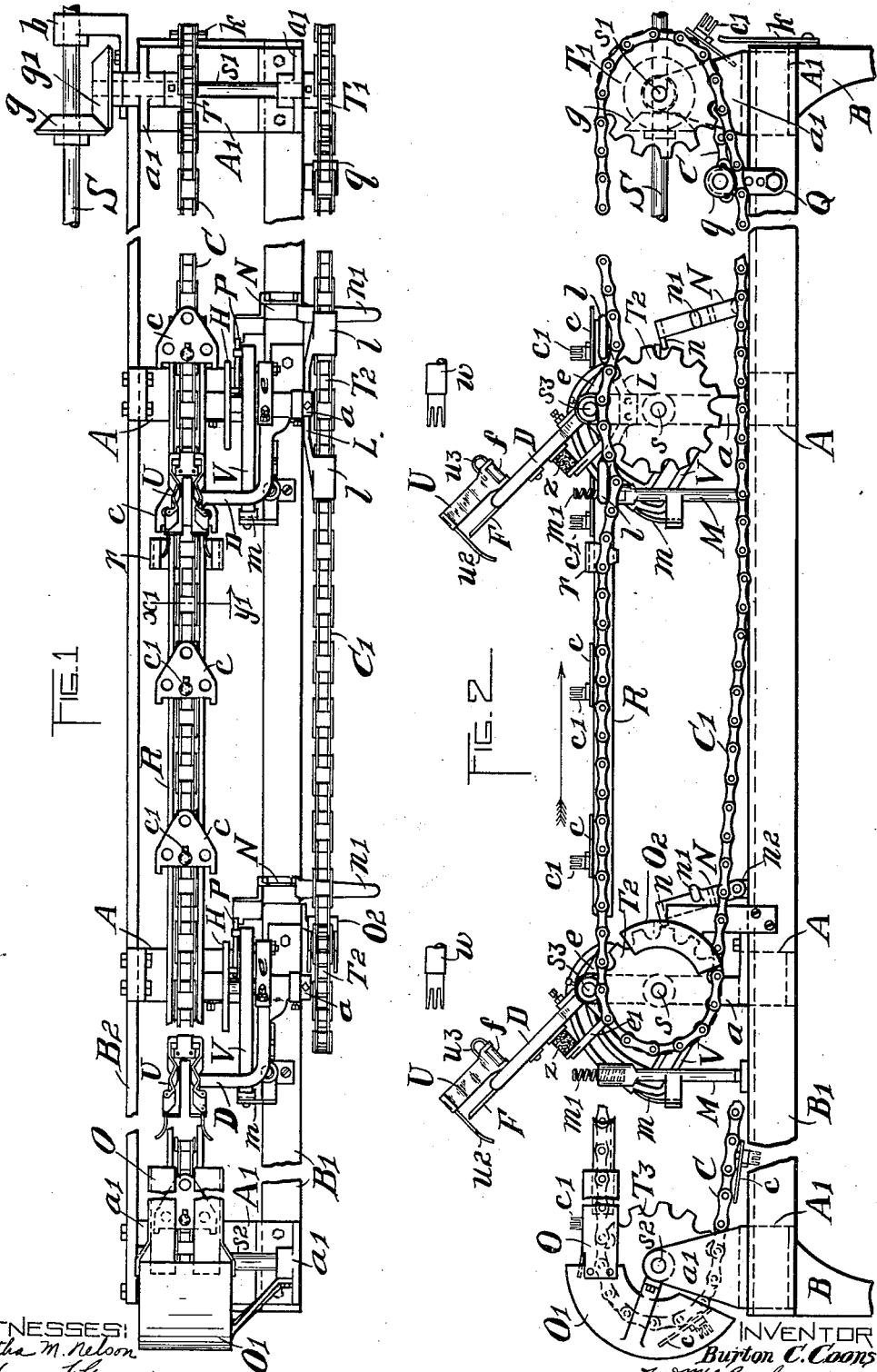

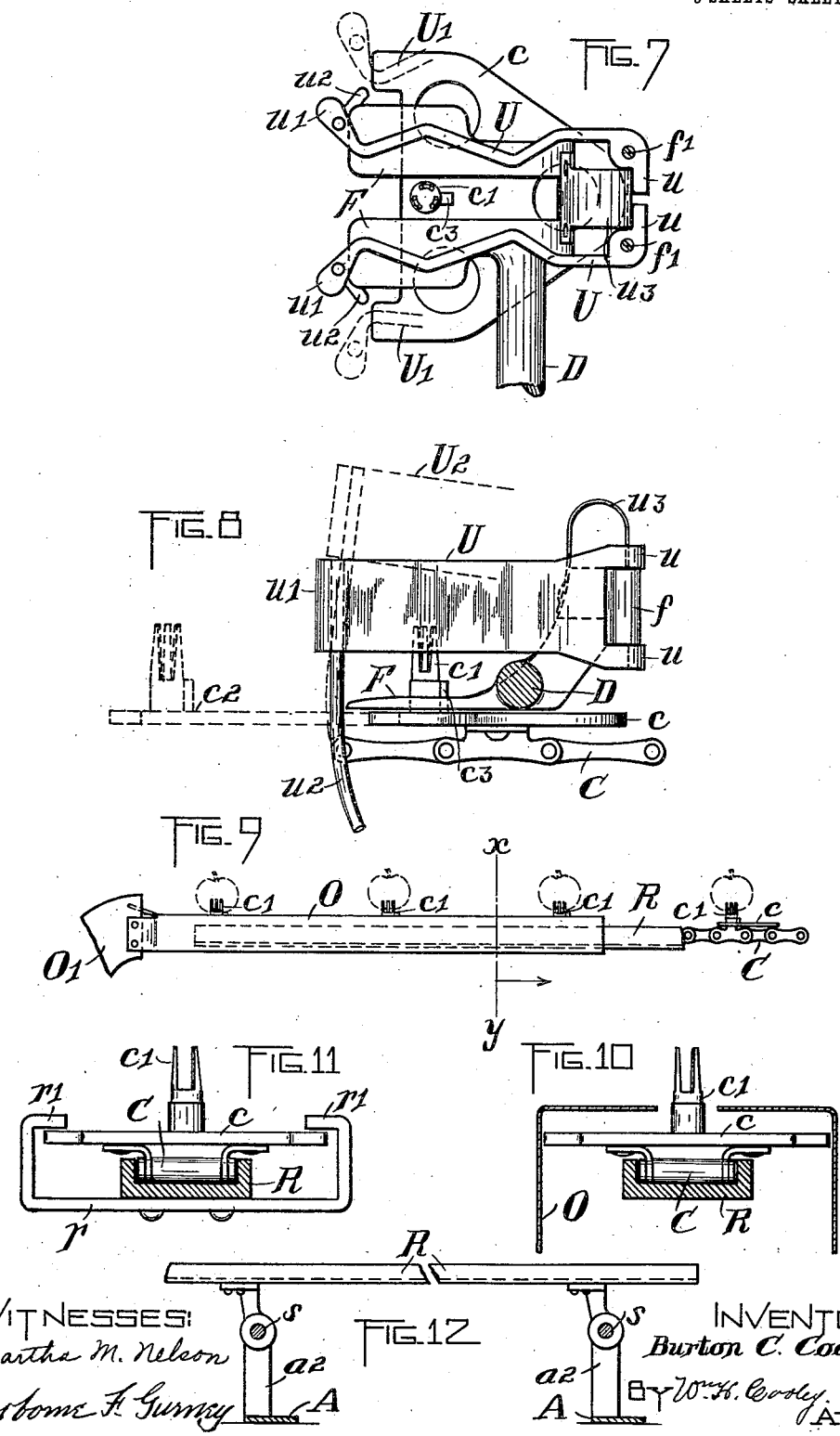

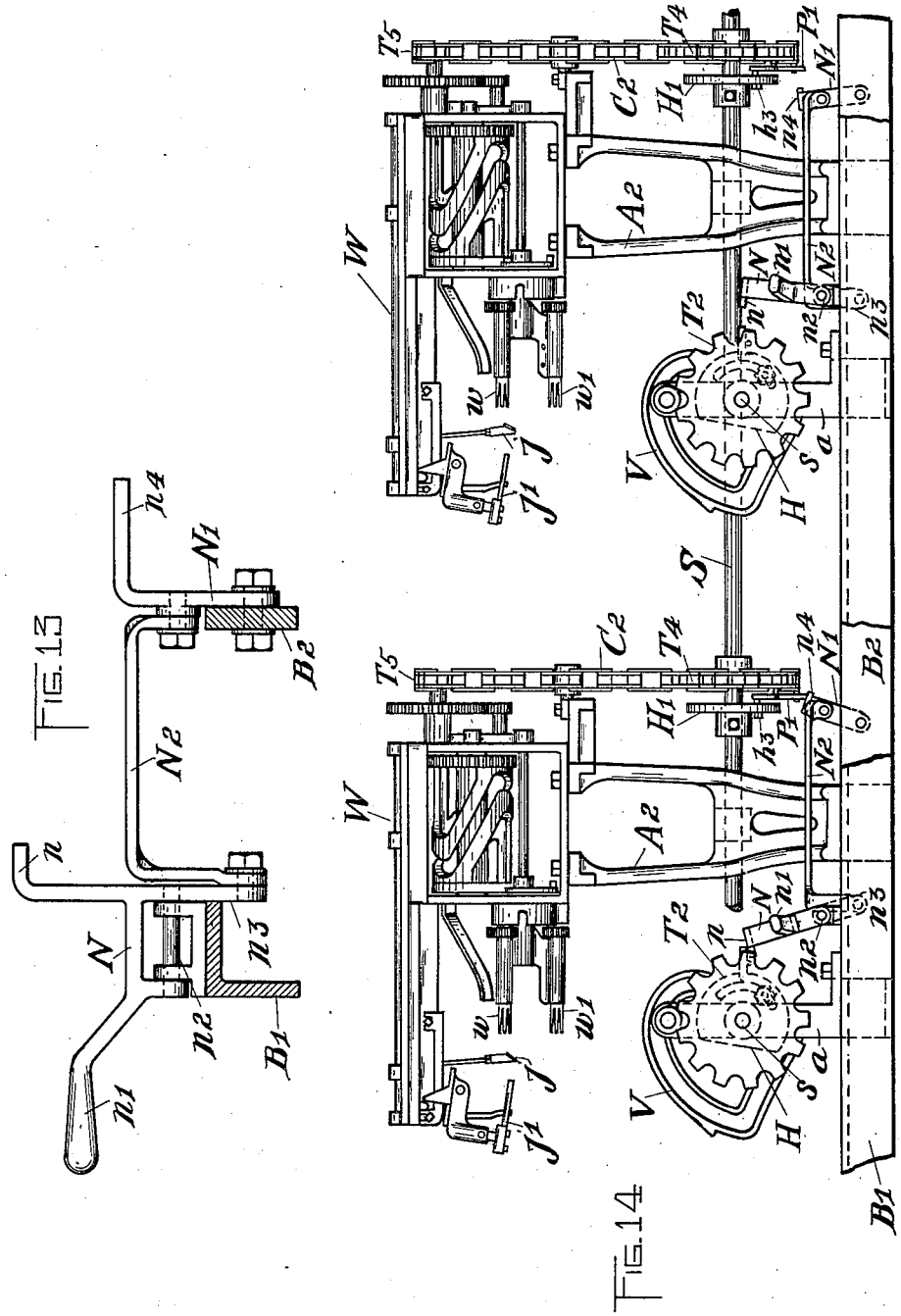

B. C. COONS.
FRUIT OR VEGETABLE FEEDING MACHINE.
APPLICATION FILED FEB. 14, 1910.
1,086,753.
Patented Feb. 10, 1914.
5 SHEETS—SHEET 5.
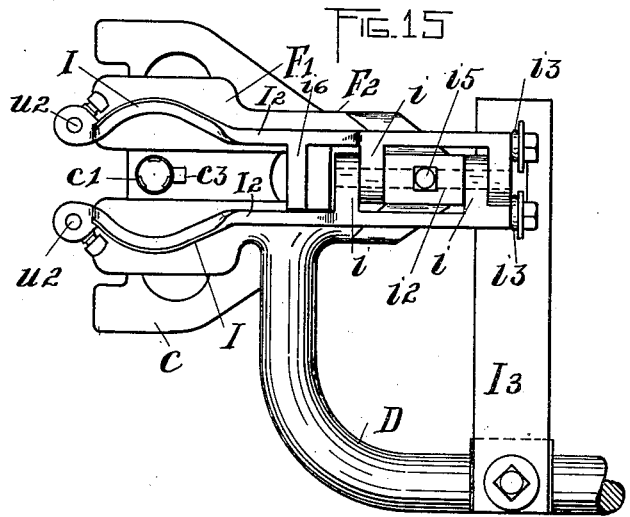
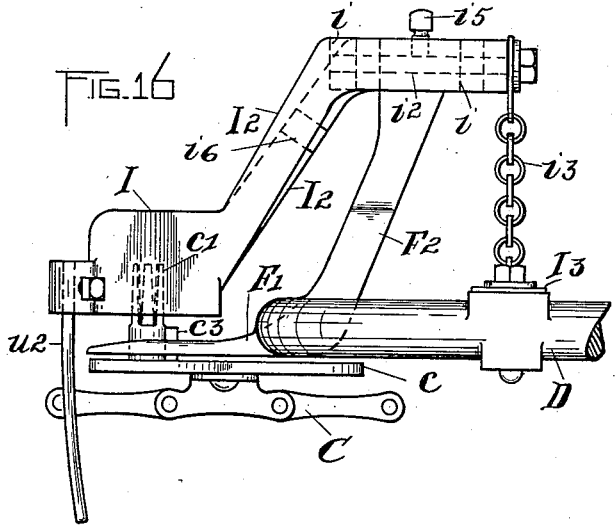
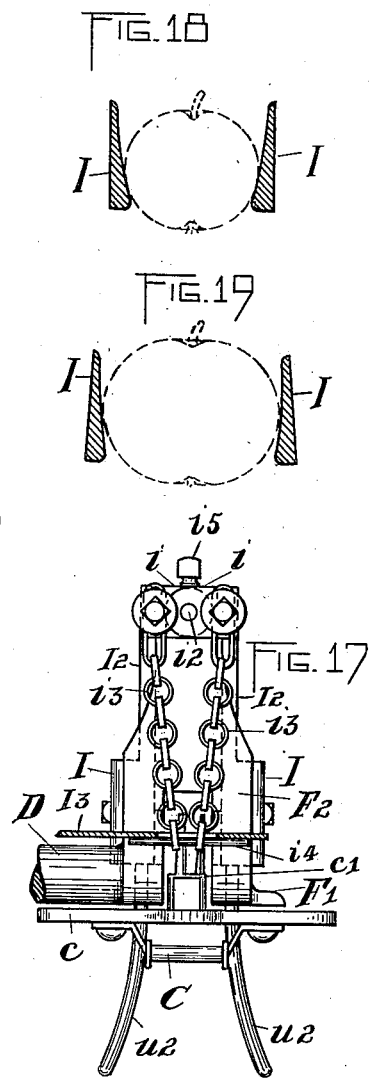
WITNESSES:
Martha M. Nelson
Osborne F. Gurney
INVENTOR
Burton C. Coons
BY W. H. Cosley
ATTY.

UNITED STATES PATENT OFFICE.

BURTON CRAIG COONS, OF ROCHESTER, NEW YORK, ASSIGNOR TO AUGUSTA M. COONS, OF ROCHESTER, NEW YORK.

FRUIT OR VEGETABLE FEEDING MACHINE.

1,086,753.  Specification of Letters Patent.  Patented Feb. 10, 1914.

Application filed February 14, 1910.  Serial No. 543,719.

*To all whom it may concern:*

Be it known that I, BURTON C. COONS, of the city of Rochester, in the county of Monroe, in the State of New York, have invented certain new and useful Improvements in Fruit or Vegetable Feeding Machines, of which the following is a specification.

This invention relates to mechanism for automatically engaging and properly centering an article of fruit, such as an apple, and impaling it upon a pin or fork and also to mechanism for feeding the apples to such engaging, centering and impaling mechanism.

The object of my present invention is to provide means for automatically centering and impaling the fruit on the fork of a paring machine or a machine to otherwise treat the fruit and having a pin or fork upon which the fruit is to be impaled to receive such treatment. In impaling the fruit upon the fork of such a machine by hand, an operator is very apt to get the fruit out of center, resulting in the unsatisfactory treatment of the fruit and frequently the hand of the operator is injured in the act of impaling the fruit on the fork.

My present invention consists in certain parts and combinations of parts, all of which will be hereinafter described, the novel features being pointed out in the appended claims.

While an apparatus may be constructed in accordance with my invention adapted to handle vegetables and fruits of different kinds, I have shown in the accompanying drawings, my invention as embodied in an apparatus more specially adapted to handling apples. Such drawings are as follows, viz:—

Figure 1 is a plan view and Fig. 2 a front elevation of the machine. Fig. 3 is an enlarged detail of the means for actuating the impaling arm as seen in front view, with parts in front thereof removed. Fig. 4 is a view of this same mechanism as seen from the rear. Fig. 5 is an enlarged plan view of the parts as seen in Fig. 4 with portions broken away to show more clearly the construction and coöperation of the parts. Fig. 6 is an enlarged plan view of the inner end of the impaling arm and the supporting mechanism and the actuating cam engaging member therefor. Fig. 7 is an enlarged plan view of the outer and fruit engaging end of the impaling arm and shows also one of the cam plates of the conveyer, coöperating therewith. Fig. 8 is a side view of the parts seen in Fig. 7 and shows, in dotted lines, other relative positions of the parts. Fig. 9 is a side view of a part of the conveyer showing articles of fruit impaled on the pins or forks carried thereby. Fig. 10 is a sectional view of the parts seen in Fig. 9 taken along the line $x$—$y$ thereof. Fig. 11 is a transverse sectional view of the conveyer and the inclosing guard therefor, taken along the line $x^1$—$y^1$ of Fig. 1. Fig. 12 is a side view of the channeled guard for supporting the conveyer links in their operative course between the upper sides of their actuating and supporting sprocket wheels. Fig. 13 is an enlarged end view of one of the clutch controlling means shown in Fig. 14. Fig. 14 shows in front view two paring machines supported on standards secured to the frame of the machine; the means for operating the paring machines and the controlling means for simultaneously throwing into or out of operation each paring machine and the cam which actuates the corresponding carrier and impaling arm. The controlling means at the left is shown in its operative position while that to the right is shown in its inoperative position. Fig. 15 is a view, similar to Fig. 7, of a preferred construction for the outer or fruit engaging end of the impaling arm. Fig. 16 is a side view, as seen from the under side in Fig. 15, and Fig. 17 is an end view, as seen from the right in Fig. 15, of the parts as seen in Fig. 15. Figs. 18 and 19 are sectional views of the jaws shown in Figs. 15, 16 and 17 when gripping a small and a large apple, respectively.

Similar letters refer to similar parts throughout the several figures.

Referring to the drawings. In my machine I make use of main frame members $B^1$ and $B^2$ which may be supported at their ends upon suitable upright members B. Between these members, $B^1$ and $B^2$, extend cross bars A having on their front ends uprights or standards $a$ and, to the rear thereof and in alinement therewith, shorter standards $a^2$, in which are formed bearings for the rear ends of the shafts $s$, the front ends of which have their bearings in the standards $a$ near their centers. The upper ends of the standards $a$ carry studs $s^3$, which may preferably comprise short pieces of shaft secured by means of set screws, as indicated in Fig. 6. On the shafts $s$ are secured the actuating wheels H by means of set screws $h^1$ threaded through the hubs $h$ thereof. These wheels H have slots $h^2$ curved concentrically with the shafts $s$ and in which there are adjustably secured, as indicated, the actuating studs $h^3$, adapted to engage the pawls P pivoted at $p$ on the rear sides of the cam wheels V. These pawls P are normally held in their operative positions with the outer arms $p^1$ thereof against the pins $p^3$ by means of the springs $p^4$, secured in the members $p^5$, carried by the cam wheels V and, when thus held, are adapted to be engaged by the pins or studs $h^3$, each adjustable angularly in the corresponding wheel H, to secure the proper coöperative engagement of the parts for the operations hereinafter described. The arms $p^1$ of pawls P extend outwardly beyond the peripheries of the cam wheels V and are adapted to be engaged by the members $n$ of the arresting arms N pivotally supported at $n^2$ on the frame member $B^1$ and having operating handles $n^1$ by means of which they may be swung either to their inoperative positions, as shown in Fig. 4, or to their operative positions, as shown in Fig. 3. In its operative position each such arm N engages the arm $p^1$ of the corresponding pawl P to force the same, against the action of the spring $p^4$, out of engagement with the stud $h^3$ whereby, as each cam wheel V is loosely mounted upon its shaft $s$, it is permitted then to remain at rest.

Oscillatively mounted on each stud $s^3$ is seen a carrier arm D and also an actuating and cam engaging arm E, the arms D being offset therefor as seen at $d$. Each arm D is provided with a boss $d^1$ between which and the outer end of the arm $e^1$ of the member E is seen a rubber cushion $z$, which may be secured to either of such members in any suitable way not shown. The member E carries another arm $e^2$ through which is threaded an adjusting screw $e^3$ provided with a locking nut, as seen, for adjusting the initial tension upon the cushion member $z$. This member E carries still another arm $e$ in the outer end of which is secured a stud, which may carry preferably a roller $e^4$ engaging within the cam $V^1$ of the wheel V. This cam $V^1$ comprises a channel formed between outer and inner peripherally extending rims. The direction of the rotations of the shafts $s$, the wheels H and cam wheels V are indicated by the arrows in Figs. 3 and 4, in which also the arms D are shown at rest and in positions midway between their uppermost and lowermost operative positions, the uppermost positions being indicated at $D^2$ and the lowermost at $D^1$ in Fig. 3 in dotted lines, and the corresponding positions of the arm $e$ being indicated at $e^6$ and $e^5$ respectively, together with corresponding positions for the then engaging portions $v$ and $v^2$, of the cam $V^1$ indicated at $v^1$ and $v^3$ respectively.

To the left of each of the cross pieces A, supporting the standards $a$ and $a^2$ thereon, is seen a standard M, having a spring $m^1$ seated in its upper end and having also a laterally extending arm $m^2$ carrying a spring pawl $m$ adapted to engage a coöperating projection $v^4$ on the corresponding cam wheel V to hold such cam wheel and the parts actuated thereby in their positions of rest, indicated in full lines in Fig. 3, in which position the arm D is held out of the pathway of the fruit on the pins or forks on the conveyer; it will be noted that just after reaching such point in its course, the projections $p^1$ on the spring actuated pawl P of both such cam wheels are engaged by the releasing members N, when such members are moved to their operative positions as seen in Fig. 3, releasing the pawls P from the studs $h^3$ and permitting therefore, the cam wheels V to remain at rest, regardless of the continuous rotation thereafter of the shafts $s$.

Referring to Fig. 3, it will be seen that the spring pawls $m$ prevent a backward rotation of the cam wheels V while the projections $p^1$ on the pawls P, by engagement with the projections $n$ on the releasing members N prevent a forward rotation of such cam wheels V, whereby provision is made for the stopping of the mechanism for feeding any one machine to permit inspection, repair or adjustment thereof. A part of the wheels H are removed to permit removal and replacement of the pawls P.

In front of the standards $a$ and on the shafts $s$ are secured sprocket wheels $T^2$, the teeth of which are engaged by the sprocket chain $C^1$, by means of which rotation is communicated to the wheels $T^2$ from the similar sprocket wheel $T^1$. This wheel $T^1$ is secured on the front end of a shaft $s^1$ revolubly supported in bearings on standards $a^1$ extending upwardly from the cross plate $A^1$. On the rear end of this shaft $s^1$ is seen a beveled gear $g^1$ meshing with a similar gear $g$ secured upon the shaft S which extends longitudinally of the machine and has its right hand end revolubly supported in a bearing $b$ secured to the plate $B^2$, while the other end of this shaft S is revolubly supported in any suitable bearing, not shown, and may have thereon, any suitable means, also not shown, for connecting it with a source of power by means of which such shaft S is driven and proper motions communicated therefrom, through the gears just mentioned to the other parts already described. On this shaft $s^1$ is seen the sprocket wheel T over which there engages the sprocket chain C comprising the conveyer and having regularly spaced on the links thereof the plates $c$, conformed as seen in plan view in Figs. 1, 7 and 15 and in side view in Figs. 2, 8, 9 and 16. Each plate $c$ carries an impaling pin or fork $c^1$. In front of each fork $c^1$ there may preferably be a small boss $c^3$, the upper surface of which may be substantially level with the top of the guard O. The left hand end of the conveyer chain C engages over a sprocket wheel $T^3$ similar to the wheel T and the left hand part of this wheel may be inclosed within a protecting guard $O^1$, and this sprocket wheel $T^3$ is secured upon a shaft $s^2$ revolubly supported in standards $a^1$ extending upwardly from a cross plate $A^1$. This conveyer chain C is properly supported at its upper horizontally disposed portion by means of the channeled plate R, in which such chain is arranged to travel, with the plates $c$ entirely above the side flanges of such channeled bar. At the extreme left hand end of the machine there is provided a slotted guard O, extending upwardly through the slot in which are seen the pins or forks $c^1$, which guard O prevents the forcing of the articles of fruit too far downwardly upon the forks or pins $c^1$. The left hand sprocket wheel $T^2$ may be provided on its right hand side with a guard $O^2$. At each point throughout the course of the conveyer chain C where an article of fruit is to be raised from a pin carried thereby, by means of a carrier arm D, there is provided a guard $r$ secured to the under side of the channeled bar R and having portions $r^1$ engaging over the plates $c$ in a way to prevent the same from being lifted upwardly by an arm D, when raising an article of fruit from the pin $c^1$ thereon, as seen in Fig. 11. This plate R, as seen in Fig. 12, is supported on the upper ends of the standards $a^2$.

In Fig. 2 part of the under member of the conveyer chain C is not shown. In order to secure a proper tension of the sprocket chain $C^1$, a roller $q$ is provided which is revolubly supported on a stud secured in the upper end of the plate Q through which holes are provided for adjustably securing the same to the frame piece $B^1$, by means of a bolt as seen.

To secure a proper engagement of the sprocket chain $C^1$ with any sprocket wheel $T^2$ intermediate of the extreme left hand wheel $T^2$ and the wheel $T^1$, an arm L is provided and secured to each corresponding standard $a$ and such arm carries curved plates $l$ adapted to engage over the top of the sprocket chain $C^1$ to force and hold the same down upon and in engagement with the teeth on the corresponding wheel $T^2$.

Each arm D, at its outer end, is curved to the rear, as seen in Figs. 1, 7 and 8 and terminates in a plate F slotted as seen in Figs. 1 and 7 to permit the passage therethrough of the impaling pins or forks $c^1$. This plate F is provided with vertically disposed and elongated ear members $f$ upon each of which, by means of a pin $f^1$, there is pivotally supported one of a pair of centering fingers or grippers U, each conformed as indicated in plan view in Fig. 7 to receive an apple from the impaling pin $c^1$ at a point substantially where, by reason of their angular conformation, they are farthest apart. The short arms $u$ of these grippers U are engaged by the ends of the U-shaped spring $u^3$ secured to the plate F, and the outer ends $u^1$ of these fingers U carry downwardly extending and curved pins $u^2$, the normal distance between which is such that they engage against opposite sides of the forward end of the plate $c$ just before the arm D reaches its lowermost position for receiving an article of fruit from the forks or pins $c^1$, such engaging positions of the grippers U being indicated in dotted lines at $U^2$ in Fig. 8, while the plate $c$ is at this time in the position indicated in dotted line at $c^2$.

The plate $c$ engages the pins $u^2$ and forces them outwardly, spreading the grippers U to the positions indicated at $U^1$ in Fig. 7 to permit the entrance between their outer ends of the articles of fruit on the forks $c^1$, as indicated in Figs. 7 and 8. At this time, however, the plate F reaches the position indicated in Figs. 7 and 8 engaging under the articles of fruit on the pins or forks $c^1$, whereupon, by the forward travel of the plate $c$, the grippers U, under the influence of the spring $u^3$, are forced inwardly to engage the fruit and at the same time the portion $v$ of the cam $V^1$ on the cam wheel V having reached the position shown in dotted lines at $v^1$ in Fig. 3, the arm D is slightly raised by the spring $m^1$ engaging the boss $d^2$ thereon to lift this arm D as far as permitted by the conformation of the cam. This provision is made in order to impart to the arm D as rapid an initial movement as possible at the beginning of the operative course or stroke and at the same time to prevent any shock resulting from the abrupt engagement of the outer wall of the part $v$ of the cam $V^1$ on the wheel V, against the pin $e^4$, as such abrupt engagement might cause an undue shock to the parts; thereafter the arm D is moved from near its horizontal position, indicated at $D^1$ in Fig. 3, to its substantially vertical position, indicated at $D^2$ in Fig. 3, and during the fore part of travel of the arm D from its horizontal to its vertical position the grippers U being each spring actuated from a common spring they tend to vibrate slightly, resulting in practically centering the apple between them at the point of their greatest divergence, which point is substantially opposite the forks $w$, upon which the fruit is to be impaled. When each arm D is moved to its uppermost position it is important that the fruit should be forced upon the forks with a slightly yielding pressure to compensate for different sizes of fruit, to effect this result I make use of the cushion $z$ of rubber, adjusted to yield quite readily for a very short distance.

During that period of time when any arm D is held at rest by the pawl $m$ after the corresponding lever N has been moved to the left to its operative position, it will of course be understood that the articles of fruit impaled upon the corresponding series of pins or forks $c^1$, carried by the conveyer chain C, are not removed. Such articles of fruit may, however, be removed by means of the strippers $k$, as seen in Figs. 1 and 2, secured to the right hand end of the framework of the machine and engaging in the pathway of the fruit on the forks or pins $c^1$, to remove the same therefrom.

The several steps in the movement of the parts actuated by the cam wheel V may be advanced or retarded as desired by the adjustment of the pin or stud $h^3$ in the wheel H, and the initial pressure upon the cushion $z$ may be adjusted by means of the bolt $e^3$ in the arm $e^2$.

Attention is called to the fact that the spring $m^1$ serves to cushion the downward stroke of the arm D and also serves by lifting the arm D as soon as the position of the cam wheel V permits thereof, to prevent the shock, which would result from an abrupt engagement against the roller $e^4$ by the cam on the wheel V, and this spring $m^1$ also serves to lift the arm D very rapidly at first in order to prevent the tearing of the fruit on the forks or pins $c^1$ as such forks or pins are progressing, while the vibrating of the grippers U after having received the fruit between them serves to properly center the fruit between such grippers U before impaling them, thus properly centered, upon the forks $w$ upon which the fruit is forced by the plates F, the forks $w$ engaging through the slot therein.

In using a machine in accordance with my invention the operator may stand upon either the front or rear of the machine, preferably at the front side and near the left hand end, and the articles of fruit may be delivered to the operator either upon a suitable platform or in a receptacle from which the operator will take them and impale them upon the forks or pins $c^1$, in the manner indicated in dotted lines in Fig. 9, in doing which it is not necessary that the fruit should be centered upon such forks or pins.

The conveyer chain C is driven in the manner already described and serves to carry the articles of fruit thus impaled to the right, when they are removed therefrom by the plates F and grippers U on the outer ends of the arms D and delivered to the forks $w$.

In the embodiment of my invention shown in the drawings provision is made for delivering the articles of fruit to two separate and distinct paring machines, the impaling forks or pins of which are shown diagrammatically at $w$ in Fig. 1 while the entire machines are shown in Fig. 14 to which, and also to Fig. 13, reference is now made.

The paring machines shown at W are mounted upon standards $A^2$ secured to the frame members $B^1$ and $B^2$ of the feeding machine. They are of the usual three forked type having the impaling pins or forks $w$, $w^1$ and $w^2$, the latter, being in the same horizontal plane and to the rear of the fork $w$, are not shown in the drawing; at $j$ are seen the paring knives and $j^1$ are the corers. All of the above named parts are operated in their turn through mechanism which has no relation to this invention except that such mechanism in each machine is driven by a sprocket chain $C^2$ which engages over a sprocket wheel $T^5$ on the machine and also over a sprocket wheel $T^4$ of greater diameter, on the main driving shaft S already referred to.

The sprocket wheels $T^4$ are loosely mounted on the shaft S and adjacent thereto at the left and secured to the shaft S are actuating wheels $H^1$. These wheels $H^1$ are similar to the wheels H seen on the shaft S and carry similar actuating studs $h^3$ adapted to engage the pawls $P^1$ pivoted on the left hand sides of the wheels $T^4$ and rotate such wheels in the same manner as shown in Figs. 3, 4 and 5 and previously described regarding wheels H.

In Figs. 13 and 14 there is shown the controlling means for simultaneously throwing into or out of operation each paring machine and the impaling arm corresponding thereto. As before mentioned the arresting arms or clutches N are pivotally supported at $n^2$ and are thrown to their operative or inoperative positions by the handles $n^1$. Arresting arms $N^1$, having extensions $n^4$ for engaging the pawls $P^1$ pivoted to the sprocket wheels $T^4$ for holding them out of engagement with the actuating pins $h^3$ on the wheels $H^1$, are pivoted to the rear frame member $B^2$.

Connecting bars $N^2$ have each, at one end, a downward extension which is pivoted to an extension $n^3$ on one of the members N below its pivotal connection at $n^2$; and at the other end this bar $N^2$ has an ear which is pivoted to the corresponding member $N^1$ above the pivotal point thereof. Thus it will be readily seen by referring to Figs. 13 and 14 that throwing one of the arresting members N to prevent rotation of a cam wheel V will also throw the corresponding arresting member $N^1$, connected thereto, to prevent rotation of the corresponding sprocket wheel $T^4$ and vice versa, and consequently simultaneously throwing into or out of operation a paring machine and its corresponding impaling arm.

In Figs. 15 to 19 inclusive, there is shown a modified and preferred construction of the grippers, the function of which, however, is the same as that of the grippers shown in Figs. 7 and 8. In this form the outer end of the arm D is curved to the rear and terminates in a plate $F^1$ similar to the plate F, seen in Fig. 7, and is similarly slotted to permit the passage therethrough of the impaling pins or forks $c^1$. The plate $F^1$ has an upwardly extending member $F^2$ and extending horizontally through a suitable hole in the upper end thereof there is seen a rod $i^2$, the center of which lies in the same vertical plane with the center of the slot in the plate $F^1$. The grippers I are each conformed as indicated in plan view in Fig. 15 to receive an apple from an impaling fork $c^1$ at a point substantially where by reason of their angular conformation they are farthest apart. These grippers I have, at their inner ends, arms $I^2$ extending upwardly and obliquely therefrom which terminate in horizontally disposed portions carrying ears $i$ having holes therethrough permitting them to receive the rod $i^2$ held in place by the set screw $i^5$ whereby the grippers I are permitted to swing on such rod $i^2$ as a center. The horizontally disposed portion of each arm $I^2$ has secured at its end one end of a chain $i^3$, the other end of which passes through an opening in the free end of a leaf spring $I^3$, the other end of which is secured to a boss on the arm D, and engages a rod $i^4$ on the under side of such spring.

The outer ends of the grippers I carry downwardly extending and curved pins $u^2$ for the same purpose as described in reference to the pins $u^2$ shown on the grippers U in Figs. 7 and 8.

When the pins $u^2$ are separated by one of the plates $c$, the grippers I are swung open against the action of the spring $I^3$ as will be readily seen by reference to the drawings. The tension on the spring $I^3$ may be increased or decreased by adjusting the chains $i^3$. The inner faces of the grippers I, as seen in Figs. 15, 18 and 19 are tapered in order that when a large apple is held between them the inner faces will be practically parallel and therefore sure to grip the apple across its greatest diameter, and are also so conformed as, on their return movement, not to tend to withdraw an apple from the fork when once impaled thereon.

It will be readily seen that a machine embodying my invention may be adapted to feed any desired number of machines having receiving forks such as $w$, in which case the several parts of the machine will be, of course, so designed that each arm D will coöperate with and receive its fruit from only the forks $c^1$ in the corresponding series.

What I claim is:—

1. In a machine for the purpose described, a supporting means to which fruit or like articles are to be successively delivered, one at a time; an endless conveyer carrying engaging means for receiving successively, one at a time, the fruit or like articles; a movable carrier adapted to receive and disengage the fruit or like articles from the engaging means on the conveyer while the same is moving and to center and deliver them to the supporting means, and means for coöperatively actuating the conveyer and the carrier, such carrier being provided with relatively movable members and means for actuating the same adapted to center the fruit or like articles while the carrier is carrying them from the conveyer to the supporting means.

2. In a machine for the purpose described, a supporting means to which fruit or like articles are to be successively delivered, one at a time; a conveyer carrying a series of engaging means for receiving successively, one at a time, the fruit or like articles; a movable carrier adapted to receive and disengage the fruit or like articles from the engaging means on the conveyer while the same is moving and to center and deliver them to the supporting means, and means for coöperatively actuating the conveyer and the carrier.

3. In a machine for the purpose described, a plurality of receiving means to which the fruit or like articles are to be delivered, one at a time, an endless conveyer carrying a plurality of engaging means receiving successively, one at a time, the fruit or like articles, a movable carrier for each receiving means adapted to receive and disengage the fruit or like articles from the engaging means on the conveyer while the latter is moving and to center and deliver them to the respective receiving means, and means for coöperatively actuating the conveyer and the carrier at such relative speed that the plurality of carriers remove the fruit or the like articles from all of the engaging means of the conveyer.

4. The combination with an apple paring machine having a supporting device on which the apples are singly supported during the paring thereof, of an endless conveyer carrying a plurality of engaging devices for receiving the apples successively, one at a time, and a movable carrier adapted to receive the apples from the engaging devices on the conveyer while the latter is moving, said carrier delivering the apples to the fork and having means for centering the apples prior to such delivery.

5. In a machine for the purpose described, a supporting means to which fruit or like articles are to be successively delivered, one at a time; an endless conveyer carrying engaging means for supporting successively, one at a time, the fruit or like articles; a movable carrier provided with relatively movable members, adapted to receive and disengage the fruit or like articles from the engaging means on the conveyer while the same is moving and to deliver them to the supporting means, and means for coöperatively actuating the conveyer and the carrier.

6. In a machine for the purpose described, a plurality of receiving means to which fruit or like articles are to be delivered, one at a time, a conveyer carrying a plurality of engaging means for receiving successively, one at a time, fruit or like articles, a movable carrier for each receiving means provided with relatively movable members and adapted to receive and disengage the fruit from the engaging means on the conveyer while the latter is moving and to deliver them to the respective receiving means, and means for coöperatively actuating the conveyer and the carrier at such relative speeds that the plurality of carriers remove the fruit or the like articles from all of the engaging means of the conveyer.

7. In a machine for the purpose described, the combination with a carrier having independently movable and spring actuated engaging means, of means for separating said engaging means and means for suddenly releasing said engaging means to permit them to vibrate to center the articles while the carrier is carrying them to a suitable receiving means.

8. A carrier for fruit handling machines comprising a support on which the fruit rests, a plurality of independently movable rigid jaws for holding the fruit on the support, and a single spring for moving said jaws toward each other.

9. In a machine for the purpose described, a movable conveyer having article-engaging means thereon, a carrier, means for actuating the carrier toward and from the conveyer, and means for actuating the carrier in advance of the first-named actuating means throughout that portion of the course of the carrier when the latter is removing an article from the engaging means on the conveyer.

10. In a machine for the purpose described, a reciprocating carrier, a movable conveyer having article engaging projections thereon, means for actuating the carrier toward and from the conveyer to remove articles from the projections on said conveyer, and spring means for actuating the carrier in advance of the first named actuating means during that portion of the course of the carrier when the latter is moving an article from the engaging means on the conveyer.

11. In a machine for the purpose described, a reciprocating carrier, a movable conveyer having article engaging means thereon, a movable cam for moving the carrier toward and from the conveyer, and spring means arranged to actuate the carrier in advance of the cam during that portion of the course of the carrier when the latter is removing an article from the article engaging means.

12. In a machine for the purpose described, a movable conveyer having article engaging projections thereon for receiving successively the articles, one at a time, a reciprocating carrier movable toward and from the conveyer and having means for stripping the article from the projections, a cam for actuating the carrier, and a spring arranged to actuate the carrier in advance of the cam throughout that portion of the course of the carrier when the latter is removing an article from a projection.

13. In a mechanism for feeding fruit or the like, the combination with a conveyer carrying an endless series of pins for receiving the fruit, of a carrier having a stripper for removing the fruit from the pins and also having relatively movable members for centering the fruit thus stripped.

14. In a mechanism for feeding fruit or the like, the combination with a continuously moving conveyer carrying an endless series of pins for receiving the fruit, of a carrier having a stripper for removing the fruit from the pins and also having means thereon for centering the fruit prior to the delivery of the latter to a suitable receiving mechanism, means for actuating the carrier, and means for moving said carrier quicker during the stripping operations.

15. In a mechanism for feeding fruit or the like, the combination with a conveyer carrying an endless series of pins, of a stop located to limit the penetration of the pins into the fruit and a carrier having a stripper adapted to pass beneath the fruit on the pins and to remove the fruit from the pins.

16. In a mechanism for feeding fruit or the like, the combination with an endless flexible conveyer having a series of fruit engaging devices thereon, of means for removing the fruit from said engaging devices, and a channel member through which travels that portion of the flexible conveyer from which the fruit is removed to hold the engaging devices in proper position for coöperation with the removing means.

17. In a mechanism for feeding fruit or the like, the combination with an endless flexible conveyer having a series of fruit engaging devices thereon; of means for removing the fruit from said engaging devices, and a fixed stop acting to prevent the flexing of the conveyer during the removal of the fruit.

18. In a mechanism for feeding fruit or the like, the combination with an endless flexible conveyer having a series of fruit engaging devices thereon, of means for removing the fruit from said engaging devices, and overhanging guides arranged on opposite sides of the conveyer and acting to prevent the flexing of the latter during the removal of the fruit.

19. In a mechanism for feeding fruit or the like, the combination with a conveyer having fruit engaging devices thereon, of a carrier for receiving the fruit from the fruit engaging devices, having relatively movable members for engaging the fruit, and means on the conveyer for separating the members of the carrier in order to receive the fruit.

20. The combination with a carrier having relatively movable members thereon for centering the apples for presentation to the fork of an apple paring machine, said carrier being movable to force the centered apple on the fork and the relatively movable members having provision for releasing the apple on the movement of the carrier away from the fork; of an endless conveyer and means for separating the relatively movable members of the carrier in order that the conveyer may feed apples thereto.

21. The combination with a carrier having relatively movable members thereon for centering the apples for presentation to the fork of an apple paring machine, said carrier being movable to force the centered apple on the fork, and the relatively movable members having provision for releasing the apple on the movement of the carrier away from the fork, of a movable conveyer having an endless series of apple engaging devices thereon, and means for separating the relatively movable members of the carrier to receive the apples from the apple engaging devices.

22. The combination with a carrier having relatively movable members thereon for centering the apples for presentation to the fork of an apple paring machine, said carrier being movable to force the centered apple on to the fork and the relatively movable members having provision for releasing the apple on the movement of the carrier away from the fork, of a movable carrier having a plurality of pins thereon, and means for separating the relatively movable members to permit the pins to carry the apples between said members when the carrier is in receiving position.

23. In a machine for feeding fruit or the like, the combination with a conveyer carrying an endless series of devices for engaging the fruit, of a carrier for removing the fruit from the fruit engaging devices, having relatively movable members for centering the fruit, and means on the conveyer for effecting a separation of the relatively movable members on the carrier to permit the apples to pass between said members.

24. In a machine for feeding fruit or the like, the combination with a conveyer carrying an endless series of devices for engaging the fruit, of a carrier for removing the fruit from the engaging devices, having relatively movable members for centering the fruit, and cams on the conveyer coöperating with the relatively movable members to separate them in order that the apples may be carried between the members by the conveyer.

25. In a mechanism for feeding fruit or the like, the combination with an endless conveyer having pins projecting therefrom, of a carrier for removing the fruit from the pins, having relatively movable members for centering the fruit thus removed for presentation to a suitable mechanism, and cams on the conveyer for effecting the separation of the relatively movable members in order that the pins on the conveyer may carry the fruit between the relatively movable members.

26. In a feeding mechanism, the combination with a carrier having independently movable centering members and means for moving said members toward each other, of means for separating said members having provision for suddenly releasing the members in order that the latter may vibrate to center the fruit.

27. In a feeding mechanism, the combination with a carrier having independently movable and spring actuated centering members, of means for separating said members having provision for suddenly releasing the members in order that the latter may vibrate to center the fruit.

28. In a feeding mechanism, the combination with a conveyer having pins thereon, of a carrier for removing the fruit from the pins, having independently movable and spring actuated centering members, and means for separating the centering members to permit the conveyer to feed the fruit between the members, having provision for suddenly releasing the members after the fruit has been removed from its pin.

29. In a feeding mechanism for fruit, the combination with a conveyer and pins thereon, of a carrier for removing the fruit from the pins, a driving mechanism for moving the carrier, and resilient means for moving the carrier independently of the driving mechanism during the removal of the fruit from the pins.

30. In a feeding mechanism for fruit, the combination with a conveyer and pins thereon, of a carrier for removing the fruit from the pin, a cam for actuating the carrier, and resilient means acting to move the carrier independently of the cam during the removal of the fruit.

31. The combination with a plurality of paring machine forks, of an endless conveyer, carriers receiving fruit from the conveyer and each adapted to present the fruit thus received to the fork of a corresponding machine, a common driving mechanism for the carriers, the conveyer and the paring machines, a clutch interposed between each carrier and the driving mechanism, a clutch interposed between each paring machine and the driving mechanism and a common controller for the clutch of each paring mechanism and the clutch of its carrier.

32. The combination with a paring machine and a conveyer, of a swinging carrier adapted to receive fruit from the conveyer and to present the same to the paring machine, and a rotary cam having a portion for operating the carrier from the conveyer to the paring machine and a portion controlling its return movement toward the carrier.

33. The combination with a conveyer, of a swinging carrier arm, a loosely journaled rotary cam for operating said arm toward and from the conveyer, a driving disk rotatable about an axis alined with the axis of the cam, an adjustable abutment on one of the two last mentioned parts and an abutment on the other of said parts to coöperate with the adjustable abutment.

34. The combination with a conveyer, and a swinging carrier arm, of a loosely journaled rotary cam for moving the swinging carrier, a driving disk rotatable about the axis of the cam and provided with a guide concentric with the said axis, an abutment adjustable on said guide, and an abutment carried by the cam for coöperation with the abutment on the driving disk.

35. In a machine for the purpose described, a conveyer having a series of fruit engaging devices thereon; means for removing the fruit from successive ones of such engaging devices and a fixed overhanging member adapted to prevent the flexing of the conveyer during the removal of the fruit from such engaging devices.

36. In a machine for the purpose described, a conveyer carrying means for engaging the articles of fruit; receiving means to which the articles of fruit are to be delivered and a carrier for receiving the articles of fruit from the conveyer and delivering them to such receiving means, such carrier being provided with relatively movable members for centering the fruit, each pivotally supported to swing upon an axis lying approximately in the same plane with the axis of the articles of fruit on the conveyer but spaced apart from the fruit and on the side of the latter opposite that on which the conveyer is located.

37. In a machine for the purpose described, a conveyer carrying means for engaging the articles of fruit; receiving means to which the articles of fruit are to be delivered and a carrier for receiving the articles of fruit from the conveyer and delivering them to such receiving means, such carrier being provided with relatively movable members for centering the fruit, each pivotally supported to swing upon an axis lying approximately in the same plane with the axis of the articles of fruit on the conveyer but spaced apart from the fruit and on the side of the latter opposite the conveyer, such relatively movable members being provided with fruit engaging members conformed to engage the articles of fruit of different sizes with their most prominent points in order to positively hold the articles of fruit and present no obstruction to the removal thereof from between them by the receiving means after having been delivered thereto.

38. In a machine for the purpose described, a carrier provided with independently movable members and means for actuating the same to center the articles of fruit between them, such means permitting independent movement of each member toward a common substantially central point between them and tending to prevent either member being moved farther away from such central point than the other by an article of fruit engaging between them.

39. In a machine for the purpose described, a carrier provided with independently movable members and means for actuating the same to center the articles of fruit between them, such means tending to force such members together in engagement with an article of fruit between them and adapted to exert the greatest effort on that one of said members which has been moved farthest away from such central point.

40. In a machine for the purpose described, a carrier provided with independently movable members and means for actuating the same to center the articles of fruit between them, such means adapted to force such members toward a common and approximately central point between them with an effort exerted equally upon each of such members when equally distant from such central point and with practically the whole effort exerted upon that one of such members which is moved farthest away from such central point, thereby leaving the other member substantially free to move to practically an equal distance from such central point.

41. A carrier comprising a pair of relatively movable jaws having their opposed faces each provided with a groove extending in the direction of the discharging line of the jaws, said grooves diverging toward the discharge side of the jaws and said jaws being supported to move in arcs which decrease the diverging relation of their opposed grooved faces as the jaws move away from each other.

42. A carrier comprising a pair of relatively movable jaws having their opposed faces each provided with a groove extending in the direction of the discharging line of jaws, said grooves diverging toward the discharge side of the jaws and said jaw being pivotally mounted to swing in arcs which decrease the diverging relation of their opposed grooved faces as such faces move away from each other.

43. The combination with an apple paring machine having a device for supporting an apple during the paring thereof, of a carrier for presenting an apple centered to said paring machine comprising a pair of jaws having their opposed faces grooved each on a line extending toward the discharge side of the jaws and movable toward and from each other in parallel lines whereby apples of different sizes may be supported for delivery to the supporting device.

44. The combination with an apple paring machine having a device for supporting an apple during the paring thereof, of a carrier for presenting apples to said supporting device comprising a pair of jaws having their opposed faces grooved and diverging relatively to each other, said jaws being pivoted to swing in arcs which decrease the diverging relation of the opposed faces but carry the jaws away from each other in parallel lines whereby apples of different sizes may be centered for delivery to the supporting device of the paring machine.

45. In a device for the purpose described, the combination with a conveyer having a series of pins thereon, of a receiving means to which the fruit is to be delivered, a movable carrier comprising a support for the fruit provided with a recess to receive the pins on the conveyer so that the support may strip the fruit from said pins, and relatively movable members for retaining the fruit on the support until the carrier delivers the fruit to the receiving means.

46. In a feeding mechanism, the combination with a carrier having a support on which the fruit rests, a pair of independently movable centering members for coöperating with fruit resting on the support and a single spring for moving said members toward each other, of means for separating said members against the action of the spring.

BURTON CRAIG COONS.

Witnesses:
MARTHA M. NELSON,
OSBORNE F. GURNEY.

Copies of this patent may be obtained for five cents each, by addressing the "Commissioner of Patents, Washington, D. C."